UNITED STATES PATENT OFFICE.

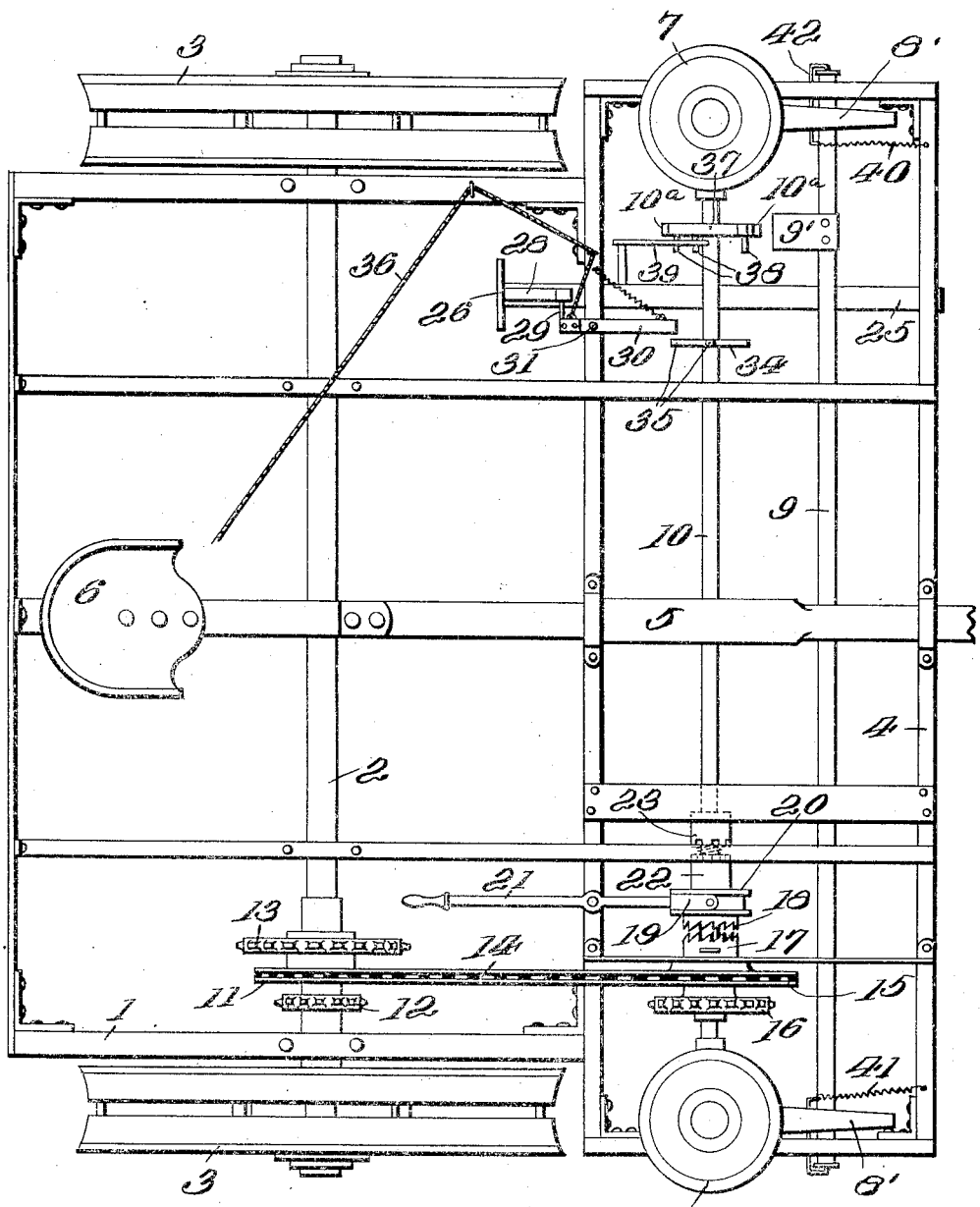

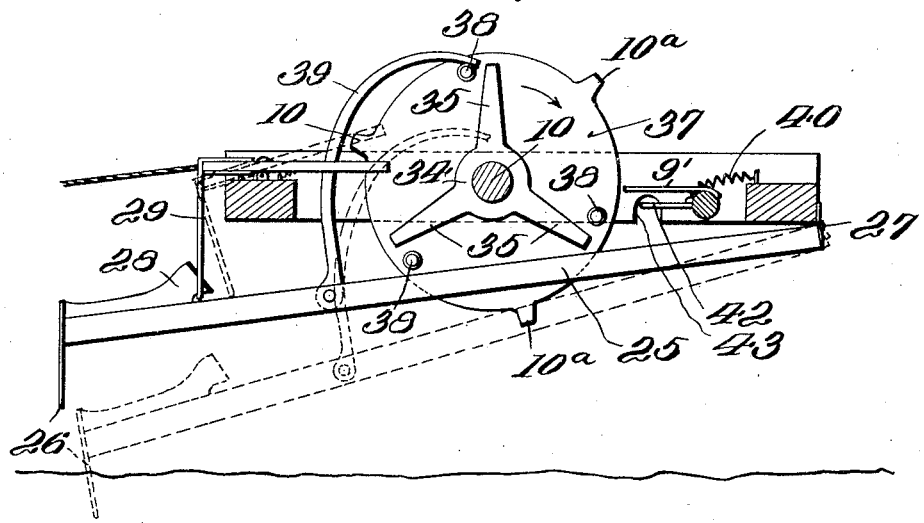
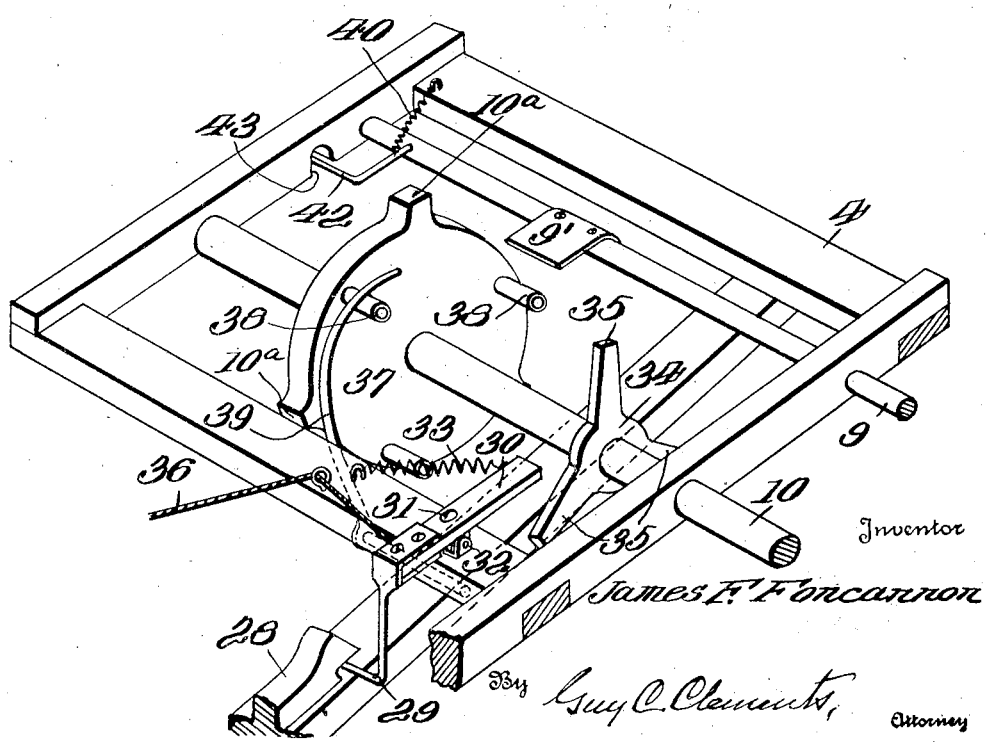

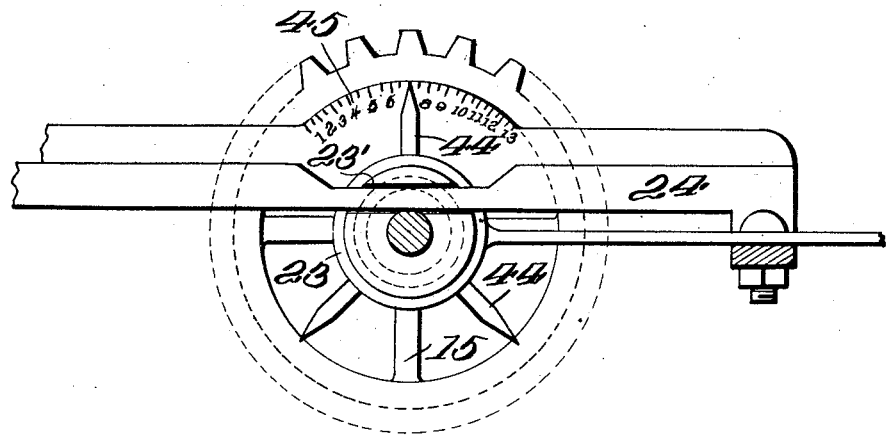
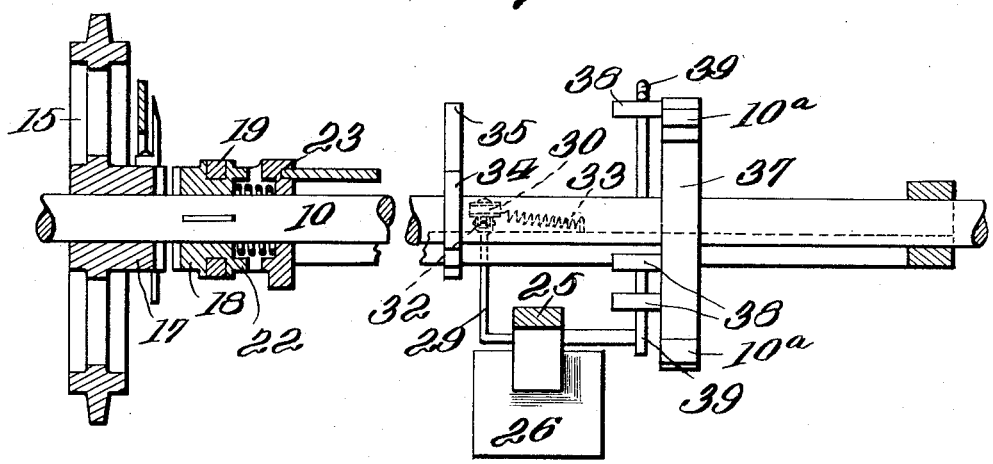

JAMES F. FONCANNON, OF EL CENTRO, CALIFORNIA.

CORN-PLANTER.

1,329,964.   Specification of Letters Patent.   Patented Feb. 3, 1920.

Application filed September 29, 1919. Serial No. 327,109.

*To all whom it may concern:*

Be it known that I, JAMES F. FONCANNON, a citizen of the United States, residing at El Centro, in the county of Imperial and State of California, have invented certain new and useful Improvements in Corn-Planters, of which the following is a specification.

The present invention relates to improvements in corn planters, and is designed particularly as an attachment, or mechanism, for use in connection with the automatic, chainless check rower type of planters.

The primary objects of the invention are the provision of mechanism for use in connection with planters of this type whereby the time of the operator is saved in actual work with the planter and whereby a comparatively inexpensive mechanism is provided for doing efficient work. And to attain these ends the present marking device and actuating means are provided and operated from the shaft which operates the dropping mechanism in the hoppers of this type of planters.

In the accompanying drawings, one complete example of the physical embodiment of the invention is illustrated, built and constructed according to the best mode so far devised for the practical application of the principles of the invention.

Figure 1 is a top plan view of a corn planter equipped with my invention.

Fig. 2 is an enlarged detail view of the marker operating mechanism, showing the dropper shaft in section and in its relation to the marker operating means.

Fig. 3 is an enlarged perspective view of other dropper actuating mechanism.

Fig. 4 is a sectional detail showing the indicator devices for the three markers.

Fig. 5 is an elevation, partly in section, showing the marker mechanism of Fig. 2 and the clutch mechanism of the dropper mechanism shaft.

In the illustration of the invention I have employed a well known type of corn planter involving the usual horizontal, main frame 1 with its driving axle 2 supported therein, and the traction wheels 3 on the ends of the axle. The supplementary frame 4 at the front of the machine has attached thereto the draft tongue 5, and the operator's seat 6 is located in convenient position for the operator to have access to the different levers and devices, for manipulation of the same. The two hoppers 7 and 7' are provided with the shoes 8 and 8' for planting and the rockshaft 9 for operating the mechanism in the shoes is supported in the frame 4 and actuated from the countershaft 10, through the tappets 10ª on the disk 37 fixed to the shaft, and these tappets, as the shaft revolves, strike the contact plate 9' on the rock-shaft 9 to oscillate or rock the shaft as usual.

The countershaft 10, which actuates the mechanism in the hoppers 7 and 7', is operated from the axle 2 through the medium of the sprocket wheel 11, or either of the wheels 12 and 13, the former being smaller and the latter larger than the wheel 11 so that different spaced hills may be planted. The sprocket wheel 11 as illustrated in Fig. 1, is provided with a chain 14 which passes over the driven sprocket wheel 15, loose on shaft 10, and over a smaller sprocket 16 which also forms a part of this sprocket wheel, for different gearing with relation to the three wheels 11, 12 and 13 on the driving axle 2. The sprocket 15 is loose on the shaft 10 and is provided with a clutch disk or member 17 forming an integral part of the wheel that is adapted for engagement with a complementary clutch disk or member 18, keyed to and slidable on the shaft. The clutch member 18 is controlled by the fork 19 on the sleeve 20 and the shifting lever 21, that is readily accessible for use by the operator. The opposite end of the slidable clutch member 18 is also adapted for engagement, as at 22 with the fixed clutch member 23, to lock the dropping mechanism of the hoppers 7 and 7'. The clutch member 23 is a sleeve of suitable dimensions and weight having at its rear end a transverse slot 23' adapted to fit or seat snugly over the transversely extending lock bar 24, which is attached securely to the frame 4, and which, when the sleeve is so engaged, holds the sleeve against turning. The slide clutch member 22 is spring-pressed from the lock sleeve, but the clutch member 22 may be readily slid over to the lock member by shifting the lever 21. It will readily be apparent that the engagement of the two clutch members 17 and 18, while the planter is moving, will insure rotation of the shaft 10 and operation of the planting mechanism of the hoppers and shoes, and that when the clutch is shifted to engage the members 22 and 23 the planting mechanism is rendered inoperative.

The marker, or hill marking device, comprises a beam 25 provided with an end plate or shovel or marker 26, preferably of metal and attached to the beam, and the beam is suspended by a hinge 27 from a portion of the front frame, in the inclined position shown. The marking device is located at the front of the machine, near one of the heels of the runner wheels, and is designed to co-act with the dropping mechanism for marking the last hill drop. For retaining the marker in uplifted inoperative position, as in Fig. 2, a hook 28 is provided on the upper edge of the beam 25, near its lower, free end, and the latch 29 engages and holds the beam uplifted through its connection with the hook or keeper 28. The latch is fixed to the release lever 30, which lever has a horizontal pivot at 31 on the frame 4, and also a vertical pivot 32 so that it may be swung both horizontally and vertically, and the contractile spring 33 is provided for holding the lever in normal position. When the lever is actuated, the latch 29 is disengaged from its keeper and the marker is released so that its shank or blade 26 drops to the soil marking the hill as described.

The marker is released, through the action of the shaft 10 and the actuating star wheel 34 fixed to revolve therewith and formed with releasing tappets 35 preferably three in number and designed for co-action with the release lever 30. The lever 30 is thus normally held out of the path of the tappets 35 by the spring 33. When co-action is desired between lever 30 and tappets 35 a pull by the driver who sits in the seat 6, on the cord 36 will swing the lever on its pivot 31 so that a moving tappet 35 will strike the lever end, lift it and swing the lever on its pivot 32 thus withdrawing latch 29 from its keeper 28 and freeing the marker. The marker is recovered through the instrumentality of the disk 37 fixed on shaft 10 and carrying pin rollers 38 and a co-acting cam bracket 39 fixed on and projecting above the beam 25 and located at all times in the path of movement of the revolving roller pins 38 on disk 37. Now, in operation, when a hill is to be marked, assuming the shaft 10 to be revolving and with it, the star wheel 34, the release lever 30 is pulled by cord 36 to position in the path of movement of the tappets 35. The revolving tappet 35 first encounters and lifts the lever 30 to swing and depress the latch 29 from the keeper 28 thus freeing the marker beam and the marker falls, the blade 26 marking the hill last planted.

Now as the cam bracket arm 39 is always in the path of movement of the roller pins 38 it will be seen that one of these roller pins will encounter the bracket arm, riding upwardly thereagainst, until it reaches the curved upper end of the bracket and thus lift the marker beam, and by releasing the cord 36 the latch 29 swings into position to connect automatically with the latch 28.

In the drawings I have illustrated three trips or tappets 10$^a$ to trip the contact plate 9' on the rock shaft 9 for the dropping mechanism in the shoes. There are three actuating devices for the marker, and I utilize in connection therewith three indicators 44 and a scale plate 45, the indicators or needles being carried by the sprocket wheel 15. These complementary devices, each involving three elements are of course subject to change in number, but the change should be uniform, and depend on the trip devices 10$^a$ for the rock shaft.

In planting a field with a straight side, the planter usually makes a mark with the corn planter wheels, or the marker, across the straight side of the field and this mark serves as the starting point for the first hill drop. The driver then places the planter in position for planting the first hill with the marker blade 26 directly over the mark. Up to this time the elements of the clutch have been out of engagement and the dropping mechanism inoperative, but after the mark is made, the lever 21 is shifted to close the clutch and travel of the planter rocks the shaft 9 to operate the automatic dropper or dropping mechanism of the shoe 8 or 8'. When the opposite side of the field is reached, and just before the last drop is to be made, the cord 36 is pulled and release lever 30 is swung over to position where it is in the path of movement of the tapper 35 so that the marker is released and falls to the ground to mark the position of the last hill dropped. Next the clutch 17—18 is opened and the clutch elements 22—23 engaged or closed, locking the trips 10$^a$ in position with relation to the contact blade 9', the teeth of the two clutch members being arranged so that one of the trip arms comes in contact with the trip or contact plate.

If the field has a low place which should be crossed without planting, in crossing the low place, the driver should note what number on the scale 45 the needle 44 indicates when the last hill is dropped, and after crossing the low place, the planting may be resumed at any time that one of the three needles or pointers indicates the same number on the scale. To provide for irregular rows, arranged at right angles to the direction of planting, and which may be out of line several inches, the indicator needle may go forward to the desired point to correct the irregularity.

What I claim is:—

1. The combination in a corn planter with its countershaft and supporting frame, of a hinged marker and means for holding it up lifted, means for releasing the marker and means for automatically returning it to position, means for holding the countershaft in inoperative position, a tripping device on the countershaft, and indicator means for coaction therewith.

2. The combination in a corn planter with the dropping mechanism, and countershaft, and supporting frame therefor of a hinged beam and marker blade thereon, a release lever and latch on the frame to hold the beam uplifted, and means on the countershaft for releasing said beam, and automatic means on the shaft and beam for lifting the released beam to normal position.

3. The combination with a movable marker and a countershaft and releasing means for the marker, of a star wheel on the shaft, to actuate the releasing means, and automatic means carried by a disk on said shaft for lifting the marker to normal position.

4. The combination with a marker and its releasing mechanism, of a countershaft and a disk thereon, a star wheel to operate the releasing mechanism, a cam bracket on the marker, a cam roller pin carried by the disk 37, a star wheel engaging the releasing mechanism to allow the marker to drop whereupon the parts on disk 37 and the beam co-act to restore the marker to uplifted position.

5. The combination in a corn planter with a hinged marker, release mechanism therefor, and a cam bracket thereon, of a countershaft and a disk revoluble therewith, a star wheel for releasing the marker, a disk on the counter shaft having roller pins and a cam bracket on the hinged marker normally in the path of travel of said roller pins to restore the marker to uplifted position.

6. In a corn planter, a plunging spot or hill marker, a planter frame carrying said marker in pivoted relation thereto, the marker being adapted to swing in a vertical plane, means for normally holding the marker in elevated inactive position, releasing means for said holding means operated by a rotary member on the seed shaft, manually operable means for throwing the releasing means into operation, and means on the seed shaft and the marker for automatically restoring the marker to its elevated position immediately after its descent is completed.

In testimony whereof I affix my signature.

JAMES F. FONCANNON.